Patented Jan. 10, 1933

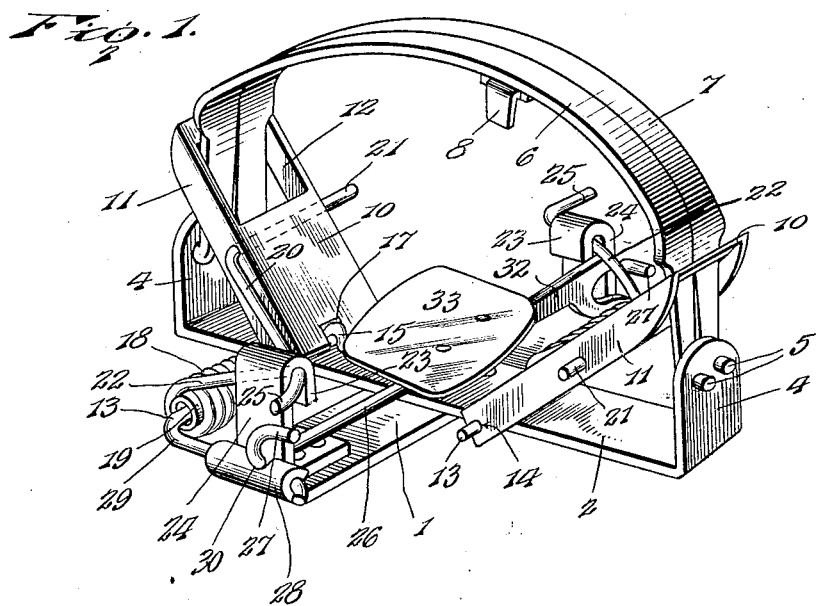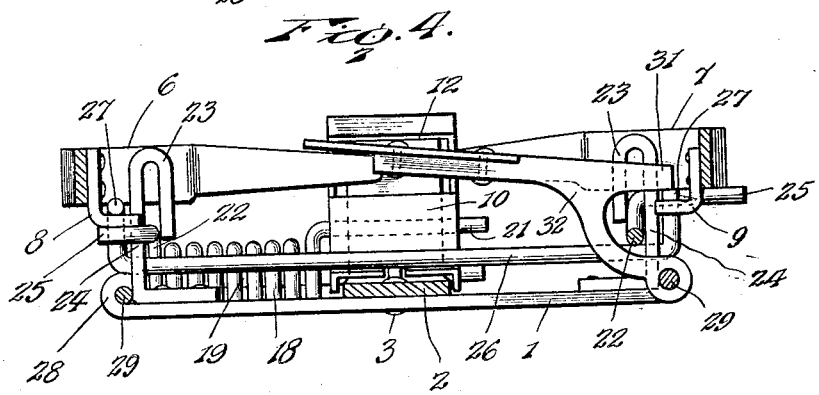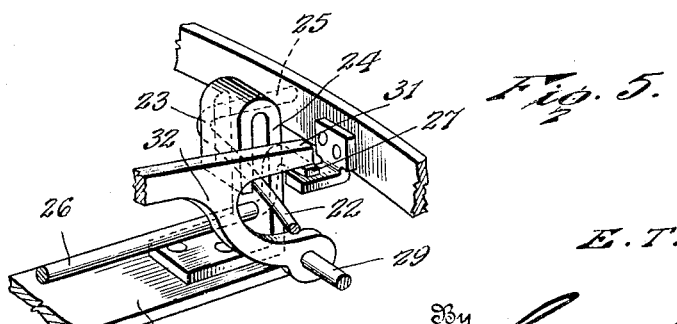

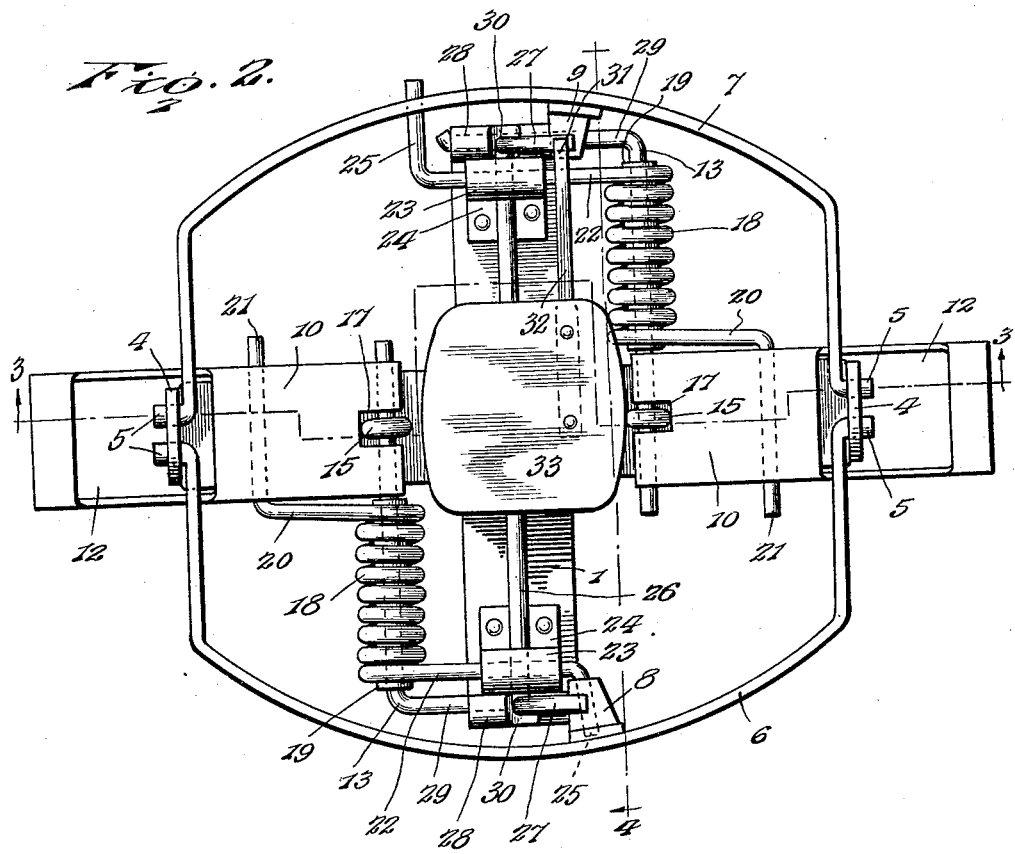
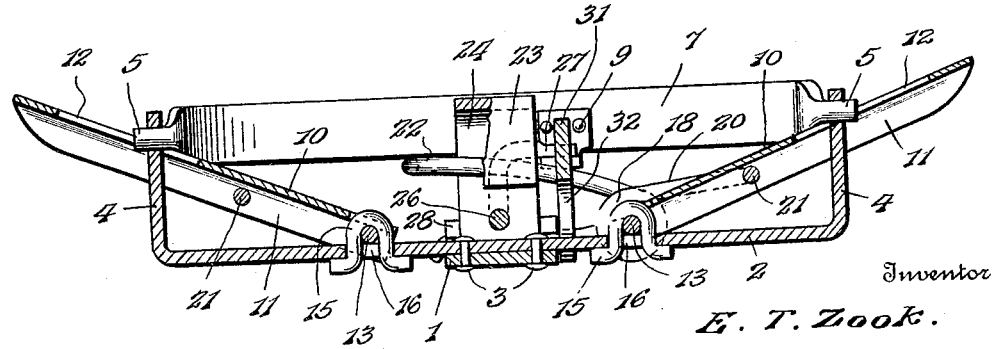

1,893,974

UNITED STATES PATENT OFFICE

ERLE T. ZOOK, OF CASPER, WYOMING

TRAP

Application filed September 1, 1931. Serial No. 560,618.

This invention relates to fishing and trapping and more particularly to a trap of the spring actuated jaw type.

When traps of this type are in use, they are placed upon the ground in such locations that an animal will be liable to step upon the trigger and release the jaws which are intended to spring to a closed position and grip the animal's leg. In some cases, it is customary to cover the trap with dirt in order to conceal it from view and, if the dirt becomes frozen, the jaws will often be held open by the frozen dirt and thereby prevented from moving to a closed position when an animal steps upon the trigger.

Therefore, one object of the invention is to provide a trap in which the jaws are not only urged towards a closed position by closing elements engaging the jaws near their pivoted ends but also urged towards a closed position by strong springs which engage the jaws intermediate their ends. By this arrangement, the springs engaging the jaws intermediate their ends will exert pressure upon the jaws at their points of least resistance and, when an animal steps upon the trigger of the trap, the jaws will be given an initial movement towards a closed position sufficient to free them from frozen ground and the closing movement then will be completed by the closing elements which engage end portions of the jaws.

Another object of the invention is to provide the trap with springs which, when engaged by the jaws prior to the jaws reaching a fully opened position, will be acted upon as the jaws are forced to a fully opened position thereby imparting additional tension to the springs and causing initial movement of the jaws, when released, to be very rapid and thereby prevent an animal from having time to jump out of the way, when the trigger is moved, and escaping before the closing elements engaging end portions of the jaws have an opportunity to move the jaws to a closed position.

Another object of the invention is to so construct this trap that the same springs which yieldably resist depression of the jaw closing elements may also serve to engage the intermediate portions of the jaws, when opened, and impart the initial closing movement of the jaws when the trigger of the trap is stepped upon by an animal.

Another object of the invention is to provide a trap of this character which is very strong in construction and may be easily set.

The invention is illustrated in the accompanying drawings wherein

Figure 1 is a perspective view of the improved trap with the jaws closed,

Fig. 2 is a top plan view of the trap showing the jaws secured in an opened position, Fig. 3 is a sectional view taken along the line 3—3 of Fig. 2, Fig. 4 is a sectional view taken at right angles to Fig. 3 along the line 4—4 of Fig. 2, and Fig. 5 is a fragmentary perspective view showing the manner in which the jaws are secured in an opened position.

This improved trap has a frame or base consisting of metal strips 1 and 2 of sufficient thickness to form a rigid frame. These strips have their intermediate portions disposed in crossed relation to each other where they are secured by rivets 3, and the ends of the strip 2 are bent upwardly to form ears 4 perforated to receive pintles 5 formed at the ends of substantially U-shaped jaws 6 and 7. These jaws, intermediate their ends, that is, upon their outer bridging or gripping portions, carry tongues 8 and 9 which are secured to the jaws, as shown, in spaced relation to the gripping edges thereof so that they will not prevent an animal's leg from being firmly gripped between the two jaws.

The closing levers 10, which may be referred to as yokes and are formed of metal plates having side flanges 11, extend longitudinally of the strip 2 and, adjacent its outer end, each yoke is formed with an opening 12 through which the end portions of the jaws extend. These openings are of such size that, when the yokes are moved to a depressed position, the ears 4 may extend upwardly through the openings. It will thus be seen that, when setting the trap, the yokes may be forced downwardly to a substantially horizontal position in which they will be located beneath the pintles 5 and the jaws will then be allowed to easily drop towards an opened position. In order to pivotally mount the yokes, rods 13 extend through openings 14 formed near the inner ends of the side flanges 11 and are engaged through clips 15 extending upwardly from the strip 2 through openings 16 formed therein, and, by inspection of Figs. 1 and 2, it will be seen that each yoke is provided at its inner end with a recess or notch 17 through which the gripping clip extends in order that the yoke may move freely.

The yokes or jaw-closing levers are to be normally retained in the elevated position shown in Fig. 1 and yieldably held against downward movement so that they may serve to hold the jaws in firm gripping engagement with an animal's leg when the trap is sprung, and for this purpose coiled springs 18 have been provided. These springs fit about sleeves 19 carried by the rods 13 and have arms 20 extending from their inner ends alongside the respectively adjacent yoke and terminating in fingers 21 engaged through openings formed in the side flanges 11 between the ends of the yokes. Other arms 22 extend from the outer ends of the coiled springs and pass freely between the down-turned ends 23 and the sides of brackets 24 which are carried by the strip 1 of the frame. Therefore, when the arms 22 bear against the abutments defined by the tops of the brackets 24, the springs will be tensioned to yieldably hold the jaw closers in a raised position but the arms 22 may be forced downwardly, as shown clearly in Fig. 4, without being released from the brackets. The ends of the arms 22 are bent to form side arms or fingers 25 which project outwardly and are so disposed that, when the jaws are moved to an opened position, they may rest upon these fingers and, by applying pressure to the jaws, the fingers and arms may be forced downwardly to the position shown in Fig. 4 in which position the springs will exert upward pressure upon the jaws and urge the jaws toward a closed position. In view of the fact that the arms 22 and fingers 25 are forced downwardly when the jaws are fully opened, additional tension will be imparted to the springs and, since the fingers engage the jaws intermediate their ends or at their gripping portions, a very strong force will be applied to the jaws, when fully opened, and the jaws will be caused to jump rapidly towards a closed position when released. It will thus be seen that sufficient force will be exerted upon the jaws, when they are released, to prevent frozen dirt from holding the jaws open and also the jaws will be moved towards a closed position so rapidly that an animal will not have time to jump out of the way before being caught.

In order that the two jaws may be held in a fully opened position with the arms 22 depressed, as shown in Fig. 4, there has been provided a rocker shaft 26 which extends longitudinally of the strip 1, above the same, and has its end portions rotatably engaged through openings in the brackets 24 near the lower ends thereof, the shaft terminating in laterally projecting upstanding bills or hooks 27. The sleeves 28 at the ends of the strip 1, through which arms 29 at the outer ends of the rods 13 are engaged, are formed with notches 30 located beneath the rocker shaft in order that the rocker shaft may be turned, as far as necessary, without the hooks striking the sleeves and interfering with proper rotation of the rocker shaft. By referring to the drawings, it will be seen that, when the jaw closers or yokes are depressed, the jaws may swing downwardly to a position in which they rest upon the side arms 25 and, by applying pressure to the jaws, the arms 22 and the jaws may then be additionally forced downwardly and so disposed that the hooks 27 may be engaged over the tongues or lugs 8 and 9. The hook which engages over the tongue 9 has the free end portion of its bill slightly flattened, as shown clearly in Figs. 4 and 5, in order that the finger 31 of a latch 32 may firmly engage over said hook. This latch is pivotally mounted upon the adjacent arm 29 and carries a trigger plate 33 disposed between the jaws over the crossed portions of the strips 1 and 2 in such position that an animal may easily step upon the plate and move the latch to a releasing position. When an animal steps upon and thereby depresses the trigger plate and moves the latch to a releasing position, the pressure exerted by the arms 22 of the springs will act upon the jaws intermediate their ends and the jaws will be very rapidly and very forcibly moved towards a closed position, the upward movement of the spring arms being arrested by the tops of the brackets 24. This movement will be immediately followed by upward movement of the yokes 10 accelerated by the spring arms and the jaws will be held in firm gripping engagement with an animal's leg and prevent the animal from escaping.

It will thus be seen that by having the trap constructed in accordance with this invention, the spring actuated yokes 10 are not depended upon to initially move the jaws towards a closed position and the jaws will not be held by frozen ground and prevented from closing.

To set the trap, the shaft 26 is rocked to turn the hooks 27 out of the paths of the lugs or tongues 8 and 9, if they happen to be lying in said paths, and downward pressure then is applied to the yokes 10 to permit the jaws to open. The pressure is then transferred to the opened jaws so that they will be forced down until they, either directly or indirectly through the lugs 8 or 9, engage and depress the spring arms 22. The shaft 26 is then rocked to engage the hooks 27 over the lugs 8 and 9 and the latch then set, the hooks 27 and shaft 26 constituting means whereby the restraining influence to hold the jaws open will be applied to both jaws.

What is claimed is:

1. In a trap, coacting jaws, means to releasably hold the jaws opened, and springs having portions engaged by the jaws when opened to initially impart movement to the jaws towards a closed position when the jaws are released and other portions serving to complete closing of the jaws.

2. In a trap, coacting jaws, closing elements for said jaws movably mounted and permitting the jaws to open when depressed, means to releasably hold the jaws opened, and springs to yieldably resist depression of said elements having portions engaged by the jaws when opened to place the jaws under tension.

3. In a trap, coacting jaws pivoted at their ends for movement into and out of a closed position, means to releasably hold the jaws opened, and means having portions for engaging the jaws intermediate their ends when opened and initially moving the jaws towards a closed position when released and other portions engaging end portions of the jaws to complete closing of the jaws.

4. In a trap, coacting jaws pivoted at their ends for movement into and out of a closed position, means to releasably hold the jaws opened, yokes slidably engaging end portions of said jaws, and springs having portions engaged by intermediate portions of the jaws when opened to initially move the jaws towards a closed position when released and other portions engaging said yokes to complete closing of the jaws.

5. In a trap, jaws movable into and out of a closed position, means to releasably hold the jaws opened, and means to yieldably resist opening of the jaws and return the jaws to a closed position when released, said means including springs having portions engaged by the jaws when adjacent a fully opened position and serving to initially move the jaws towards a closed position when released.

6. In a trap, jaws movable into and out of a closed position, means to releasably hold the jaws opened, and means to yieldably resist opening of the jaws and return the jaws to a closed position when released, said means including elements engaging said jaws, and springs having portions for engaging said jaws and initially moving the jaws towards a closed position and other portions engaging said elements to complete closing of the jaws.

7. In a trap, a frame, coacting jaws pivoted at their ends to said frame, closing elements pivoted to said frame and engaging end portions of said jaws, abutments carried by said frame, springs having arms engaging said closing elements and other arms engaging said abutments to tension the springs and yieldably resist depression of said elements, the last-mentioned arms being engaged by intermediate portions of the jaws when the jaws are opened, and means to releasably secure the jaws in an opened position.

8. In a trap, a frame, coacting jaws pivoted at their ends to said frame, closing elements pivoted to said frame and engaging end portions of said jaws, abutments carried by said frame, springs having arms engaging said elements and other arms engaging said abutments to tension the springs and yieldably resist depression of said elements, said elements when depressed permitting opening of the jaws, and means to releasably secure the jaws in an opened position, said jaws when opened engaging the last mentioned arms and depressing the same to increase tension of the springs and cause the said arms to initially impart closing movement to the jaws when released.

9. In a trap, a frame, coacting jaws pivoted at their ends to said frame, closing elements pivoted to said frame and engaging end portions of said jaws, abutments carried by said frame, springs having arms engaging said elements and other arms engaging said abutments to tension the springs and yieldably resist depression of said elements, said elements when depressed permitting opening of the jaws, and means to releasably secure the jaws in an opened position, said jaws when opened having their intermediate portions resting upon the last mentioned arms to depress the same and cause the said arms to exert pressure upon the jaws and initially move the jaws towards a closed position when released.

10. In a trap, a frame, coacting jaws pivoted at their ends to said frame, closing elements pivoted to said frame and engaging end portions of said jaws, abutments carried by said frame, springs having arms engaging said elements and other arms engaging said abutments to tension the springs and yieldably resist depression of said elements, said elements when depressed permitting opening of the jaws, the jaws when opened resting upon the last mentioned arms and depressing the same to place additional tension upon the springs and cause the said arms to urge the jaws towards a closing position, a keeper carried by said frame and movable into and out of position to engage said jaws when opened and retain the last mentioned jaws of the springs depressed, and a latch to engage said keeper and releasably hold the jaws opened.

11. In a trap, a frame, coacting jaws pivoted at their ends to said frame, closing elements embracing end portions of said jaws, rods carried by said frame and pivotally mounting said closing elements, brackets carried by said frame, springs carried by said rods and having arms engaging said closing elements and other arms engaging said brackets to tension the springs and yieldably resist depression of the closing elements, the closing elements when depressed permitting said jaws to move to an opened position and the jaws when opened resting upon the last mentioned arms whereby the said arms may be depressed and tension applied to the jaws to urge the jaws towards a closed position, and means to releasably secure the jaws opened with the last mentioned arms under tension.

12. In a trap, a frame, coacting jaws pivoted at their ends to said frame, closing elements embracing end portions of said jaws, rods carried by said frame and pivotally mounting said closing elements, brackets carried by said frame, springs carried by said rods and having arms engaging said closing elements and other arms engaging said brackets to tension the springs and yieldably resist depression of the closing elements, the closing elements when depressed permitting said jaws to move to an opened position and the jaws when opened resting upon the last mentioned arms whereby the said arms may be depressed and tension applied to the jaws to urge the jaws towards a closed position, a rocker shaft carried by said brackets and having bills to engage said jaws when the jaws are opened and the last mentioned arms depressed, and a latch to engage one bill and releasably hold the jaws opened having a trigger disposed above the frame between the jaws when the jaws are opened.

13. A trap comprising cooperating pivoted jaws, closing yokes engaged with end portions of the jaws, said yokes being fulcrumed at their inner ends adjacent the jaws, torsion springs having their inner ends engaged with the yokes between the ends thereof and their outer ends arranged to engage the outer portions of the jaws when the jaws are in open position, and means for releasably holding the jaws in open position.

14. A trap comprising cooperating pivoted jaws, closing yokes engaged with end portions of the jaws, said yokes being fulcrumed at their inner ends adjacent the jaws, torsion springs having their inner ends engaged with the yokes between the ends thereof and their outer ends arranged to engage the outer portions of the jaws when the jaws are in open position, and means acting directly upon both jaws for releasably holding the jaws in open position.

15. A trap comprising cooperating jaws, projections on the outer portions of the jaws, a rock shaft having hooks at its ends to engage over said projections when the jaws are in open position, releasable means cooperating with the rock shaft to hold the jaws open, and means for closing the jaws when they are released.

In testimony whereof I affix my signature.

ERLE T. ZOOK. [L. S.]